United States Patent [19]

Kendig et al.

[11] Patent Number: 4,955,269
[45] Date of Patent: Sep. 11, 1990

[54] TURBINE BLADE FATIGUE MONITOR

[75] Inventors: Robert P. Kendig, Monroeville; Roger A. Lucheta, Murrysville; Francis S. McKendree, Pittsburgh, all of Pa.

[73] Assignee: Westinghouse Electric Corp., Pittsburgh, Pa.

[21] Appl. No.: 333,718

[22] Filed: Apr. 5, 1989

Related U.S. Application Data

[63] Continuation of Ser. No. 152,266, Feb. 4, 1988, abandoned.

[51] Int. Cl.⁵ .............................................. G01M 3/00
[52] U.S. Cl. ...................................... 73/577; 73/116; 73/660
[58] Field of Search .................. 73/116, 119 R, 577, 73/775, 776, 660, 602, 600, 578; 417/63; 415/118

[56] References Cited

U.S. PATENT DOCUMENTS

| | | | |
|---|---|---|---|
| 2,281,163 | 4/1942 | Lane | 73/577 |
| 2,738,671 | 3/1956 | Fiske, Jr. et al. | 73/577 |
| 3,502,967 | 3/1970 | Bridges et al. | 73/116 |
| 3,597,963 | 8/1971 | Smejkal et al. | |
| 3,654,803 | 4/1972 | Robinson | |
| 3,680,363 | 8/1972 | Holz et al. | |
| 4,112,747 | 9/1978 | Aldrige et al. | 73/116 |
| 4,153,388 | 5/1979 | Naegeli et al. | |
| 4,287,418 | 9/1981 | Divin et al. | 250/336.1 |
| 4,335,600 | 6/1982 | Wu et al. | |
| 4,518,917 | 5/1985 | Oates et al. | |
| 4,603,578 | 8/1986 | Stoltz | 73/151 |
| 4,608,861 | 9/1986 | Wachtler et al. | 73/151 |
| 4,691,707 | 9/1987 | Sankar | 73/602 |
| 4,733,361 | 3/1988 | Krieser et al. | 340/945 |

FOREIGN PATENT DOCUMENTS

| | | |
|---|---|---|
| 0179618 | 4/1986 | European Pat. Off. |
| 1413941 | 9/1965 | France ............ 73/116 |
| 2349828 | 11/1977 | France . |
| 567996 | 8/1977 | U.S.S.R. ........... 73/577 |
| 827814 | 8/1981 | U.S.S.R. ........... 415/118 |
| 616968 | 6/1949 | United Kingdom ... 73/578 |
| 2143037 | 6/1985 | United Kingdom . |

OTHER PUBLICATIONS

"High-Speed Noncontacting Instrumentation for Jet Engine Testing", ASME The American Society of Mechanical Engineers, pp. 1-6, Paper No. 80-GT-18, 1980.

"Development of a Noninterference Technique for Measuring Turbine Engine Rotor Blade Stresses", American Institute of Aeronautics and Astronauts, Inc. 1985, pp. 1-5, 1985.

*Primary Examiner*—Robert Raevis

[57] ABSTRACT

An on-line vibratory fatigue monitor measures displacement of an object such as the blade of a turbine rotor to generate a displacement signal and calculates accumulated fatigue in the object in dependence upon the displacement signal. The displacement of the object may be detected by passive proximity probes which generate signals indicative of changes in magnetic flux or capacitance between the sensor and the turbine blade. An analog/digital converter converts the signals from the probes to digital signals indicating displacement of the turbine blades. The digital signals are processed, preferably by taking a Hilbert transform, to detect the amplitude envelope and instantaneous frequency of the displacement. The amplitude and frequency are combined with steady state stress on the object to determine fatigue usage which is accumulated by constantly monitoring vibratory displacement and changes in the steady state stress.

12 Claims, 3 Drawing Sheets

TURBINE BLADE FATIGUE MONITOR

This application is a continuation of application Ser. No. 07/152,266 filed Feb. 4, 1988, now abandoned.

BACKGROUND OF THE INVENTION

1. Field of the Invention

The present invention is related to measurement of fatigue caused by vibration and, more particularly, to the measurement of accumulated metal fatigue in the rotor of a turbine.

2. Description of the Related Art

Conventionally, stresses in turbine blades, like other devices, are measured using strain gauges which attach directly to the turbine blade and communicate to monitoring equipment outside the turbine via slip rings or telemetry. An alternative system has undergone development at the Arnold Engineering Development Center of the U.S. Air Force Systems Command. The Arnold system utilizes line-focusing photo detectors which provide non-interference measurement of jet engine turbine rotor blade deflection. The sensors are closely spaced on the periphery of the engine casing with each sensor radially aligned and the group of sensors aligned with the path of the rotor blade tips. Two sensors are used for detecting non-integral vibration, i.e., vibration at frequencies other than multiples of the rotation speed. Four sensors are used for detecting integral vibration, i.e., vibration at a frequency which is a multiple of the rotation speed. The signals produced by these sensors can be processed with reference to a once-per-revolution signal to determine amplitude, frequency and phase of the vibration of the each blade in a row. An additional set of these sensors is required for each row which is monitored.

Using the deflection data provided by the sensors, stress information for all blades in each instrumented row can be determined on-line by using transfer functions to convert the deflection data to stress. These transfer functions can be determined using finite-element analysis and bench-testing of each row of blades before operational testing. While the information provided by the Arnold system is useful, particularly in testing recently serviced turbines, additional information is desirable for an on-line system which is used to monitor a turbine during operation.

SUMMARY OF THE INVENTION

An object of the present invention is to provide an on-line monitor that indicates accumulated fatigue usage of a device.

Another object of the present invention is to provide an on-line fatigue usage monitor which includes the effects of both vibratory stress and steady stress.

The above objects are obtained by providing a method for determining damage caused by an accumulative force, comprising the steps of detecting displacement caused by the force, calculating amplitude and instantaneous frequency of the force from the detected displacement and accumulating the damage in dependence upon the calculated amplitude and instantaneous frequency. The present invention is embodied by a vibratory fatigue measuring apparatus, comprising sensor means for generating a displacement signal indicating displacement of an object caused by vibration of the object and fatigue accumulation means for calculating fatigue in the object in dependence upon the displacement signal. When applied to a turbine having a plurality of blades, the sensor means preferably comprises at least two sensors positioned outside a path taken by the turbine blades. When N sensors are used, the vibration and fatigue usage to the n/2'th harmonic can be computed. Twenty-four sensors will give the effect of all harmonics to the 12th, but fewer sensors are necessary if it can be determined that fewer harmonics are active. The preferred means for determining frequency and amplitude of the turbine blades uses a Hilbert transform of the displacement signal.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Many types of devices are subject to stresses that build up or accumulate fatigue which eventually causes defects to appear in the material of which the device is made. The amount of fatigue which a device can withstand is termed "fatigue life" and the amount of fatigue which a device has withstood is termed "fatigue usage". By accumulating the fatigue usage, the remaining fatigue life can be calculated from equation (1).

$$2 \int_0^T \{\epsilon_a(t)/(\epsilon_F - \epsilon_m(t)) - (\epsilon_1/\epsilon_F)\}^2 F(t) \, dt = 1 \qquad (1)$$

Equation (1) can be derived from Goodman's law and Miner's hypothesis, where t is time, $\epsilon_a(t)$ is the actual vibratory stress, $\epsilon_F$ is the stress which causes failure from application of a single load ignoring the formation of a plastic hinge, $\epsilon_m(t)$ is a slowly varying or essentially steady stress, $\epsilon_1$ is the limit stress which causes failure at, e.g., the millionth vibration, and F(t) is the frequency of the vibration. The values $\epsilon_F$ and $\epsilon_1$ are conventionally determined for a specific object by laboratory measurement or finite element analysis. In the case of a turbine rotor, within each row the blades are ordinarily shaped the same, but one row is different from another. Therefore, the values $\epsilon_F$ and $\epsilon_1$ would be determined separately for each row of turbine blades.

Similarly, the steady stress $\epsilon_m$ on an object to be monitored by the present invention must be determined beforehand as a function of measurable values. In the case of turbine blades, the torque generated by the turbine could be directly measured or calculated from measurements of inlet enthalpy $H_1$, outlet enthalpy $H_2$, angular speed $\omega$ and mass flow rate m, which may then be combined with stage efficiency n, mean blade diameter $r_b$ and the number of blades per row $M_b$ to calculate a relationship between the steady stress $\epsilon_m$ and the torque as indicated in equation (2).

$$\epsilon_m \sim \dot{m}(H_1 - H_2)n/\omega M_b r_b \quad (2)$$

Thus, knowing the limit stress $\epsilon_l$, single load failure stress $\epsilon_F$ and the distribution of torque in a turbine, the fatigue usage can be calculated from torque, measured either directly or indirectly, and the amplitude and frequency of vibrations of individual turbine blades. The actual vibratory stress $\epsilon_a(t)$ relationship to amplitude of blade tip deflection can be measured using a stress/strain gauge mounted on a disassembled turbine rotor.

Figure 1:
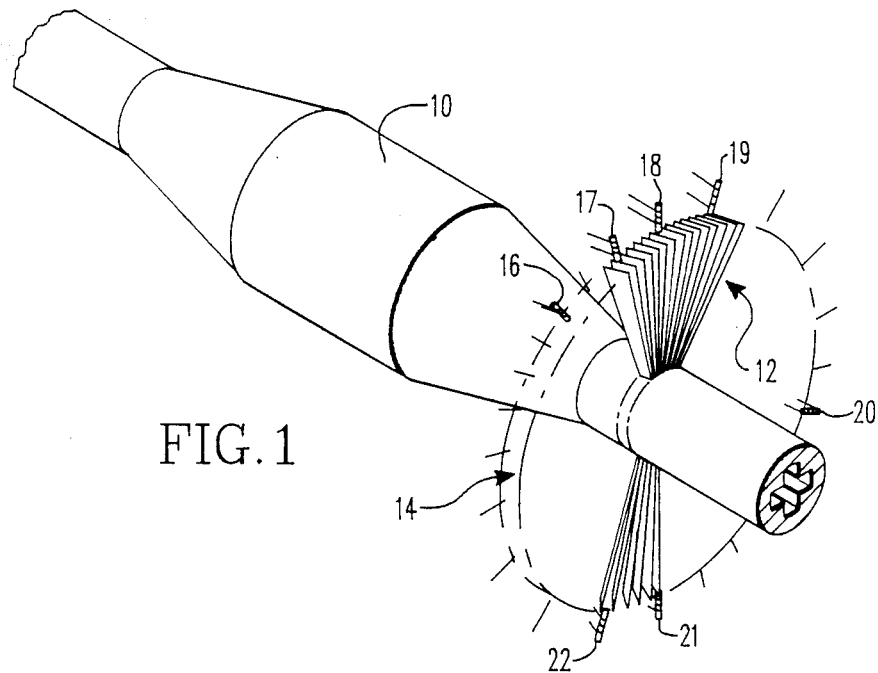
FIG. 1 is a perspective view of a turbine shaft and one row of blades with sensors indicated as used in the present invention.

A conventional rotor shaft 10 of a turbine, together with some of the turbine blades 12 in one row 14 of turbine blades is illustrated in FIG. 1. In accordance with the present invention, sensors 16–22 are positioned outside a path taken by the turbine blades in radial alignment with the blades. Only seven sensors are fully illustrated in FIG. 1, but additional sensors could be positioned as indicated by the tick marks around the turbine blade disk 14.

Figure 2:
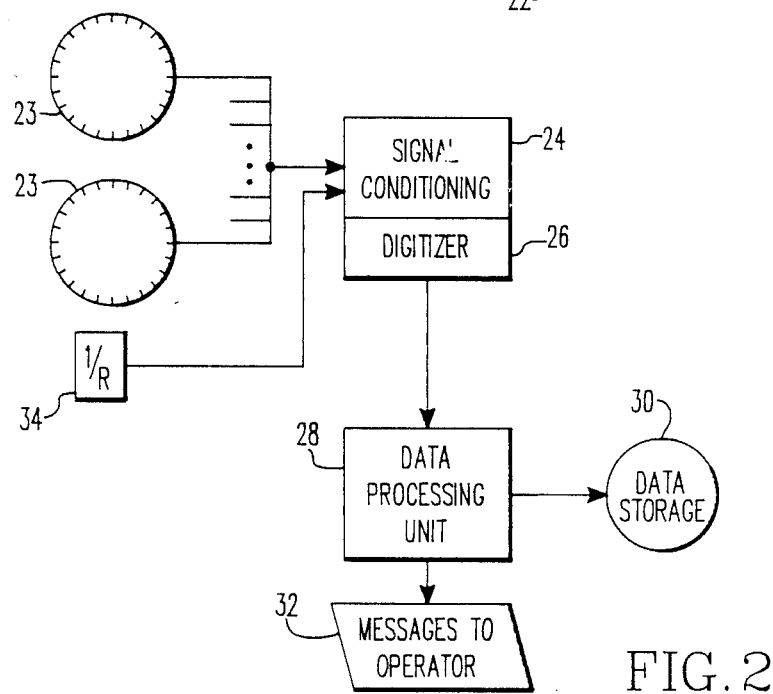
FIG. 2 is a block diagram of the present invention.

As illustrated in FIG. 2, several groups 23 of sensors are provided, one group 23 for each of the rows of the turbine whose blades are to be monitored. This may not be every row, depending upon the construction of the turbine, maintenance experience, etc. For example, if within several rows of blades, experience shows that the first breakage always occurs in one or two of the rows, it may be sufficient to monitor only those rows which are likely to suffer the most from fatigue. The groups 23 of sensors provide means for generating a displacement signal indicating displacement of an object, such as a turbine blade, caused by vibration. The displacement signals output from the groups 23 of sensors are supplied to signal conditioning circuitry 24 which removes identifiable noise and strengthens the signals as necessary before the signals are supplied to a digitizer 26. The digitizer 26 performs analog/digital conversion to detect changes in the signals output by the groups 23 of sensors and provide digital data that can be processed by a data processing unit 28. The data processing unit 28 uses formulas and data stored in a data storage unit 30 to provide fatigue accumulation means for calculating fatigue usage in dependence upon the displacement signals. The fatigue usage is recorded in the data storage unit 30 and output to an operator as messages 32.

The data processing unit 28 performs several functions in order to calculate fatigue usage. First, it is necessary to identify which blade is being detected by a sensor. According to the present invention, this determination is made using a once-per-revolution signal supplied by a sensor 34. The position of each of the blades at the time the once-per-revolution signal is generated is known. The time between generations of adjacent once-per-revolution signals can be used to calculate the angular speed $\omega$ of the blades.

Figure 3:
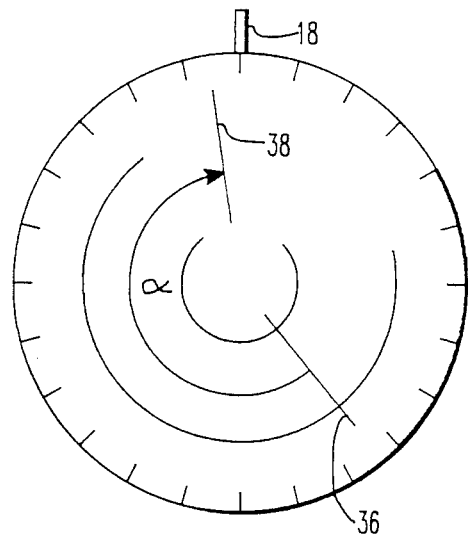
FIG. 3 is a schematic diagram illustrating how a blade is identified by the system.

The once-per-revolution signal is also used to determine the position of a blade. This is accomplished as illustrated in FIG. 3. Assuming one of the blades 12 is at position 36 when the once-per-revolution signal is received, it will be approaching sensor 18 at position 38 after having moved an angular displacement $\alpha$. The time required for a turbine blade to move from position 36 to position 38 can be determined from the angular velocity $\omega$. The data processing unit 28 is thus able to calculate an expected arrival time for each of the blades 12 at each of the sensors, e.g., 16–22, based upon the once-per-revolution signal.

Figure 4A:
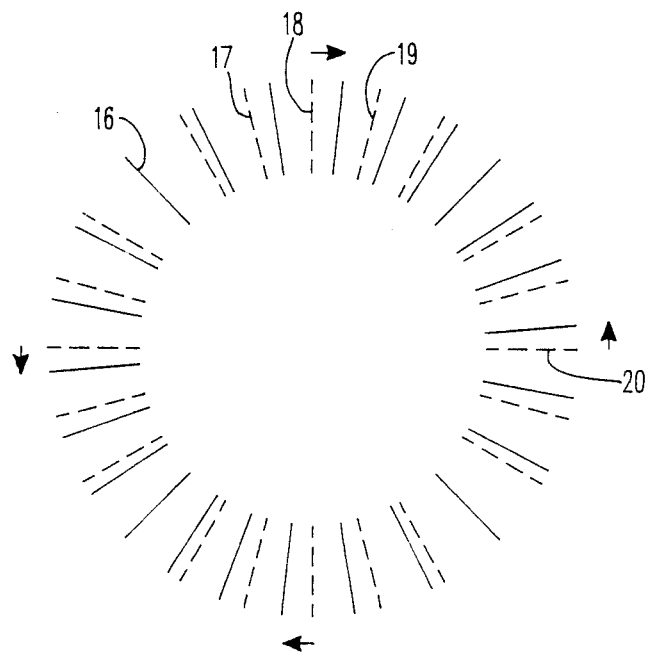
FIGS. 4A and 4B are graphical illustrations of displacement of a turbine blade from an expected position caused by vibration.

The difference between expected and actual arrival time is illustrated for a twenty-four (24) sensor per row system in FIG. 4A. The expected arrival time is indicated by dashed lines while the actual position of a rotor blade 12 at that time is indicated by a solid line. The sensor positions which correspond to the sensors illustrated in FIG. 1 have corresponding reference numerals in FIG. 4A. The rotor blade illustrated in FIG. 4A is oscillating approximately twice for every revolution of the turbine blades. As illustrated in FIG. 4A, the blade being monitored arrives at sensor 16 at the expected time. However, it arrives at sensors 17–19 before the expected time and at sensor 20 after the expected time. As is evident from FIG. 4A, sensors 18 and 20 respectively provide the maximum positive and negative displacements measured by the sensors. Approximately the same measurements are provided by the sensors opposite sensors 18 and 20 since the blade is vibrating at approximately twice the revolution speed of the turbine. If it was vibrating three times as fast as the rotation speed, there would be three each maximum positive and maximum negative displacements.

Figure 4B:
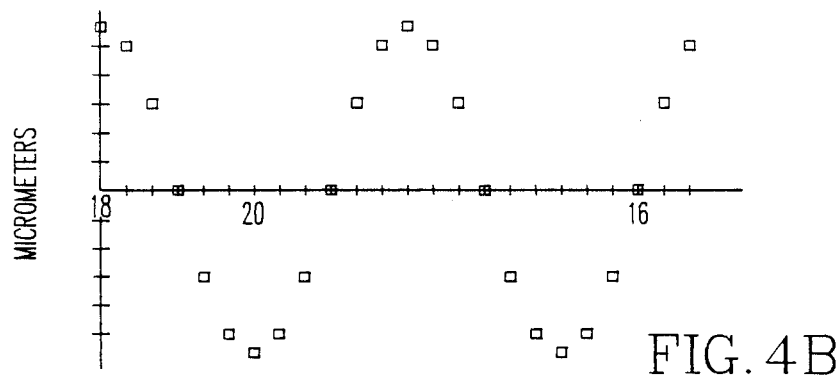

The amount of displacement measured by each of the sensors is illustrated in FIG. 4B. The measurement made by sensor 18 is shown along the y-axis and the measurements of sensors 16 and 20 are indicated by reference numerals along the x-axis. The oscillatory nature of the vibration is more readily apparent from the graphical representation in FIG. 4B.

Figure 5:
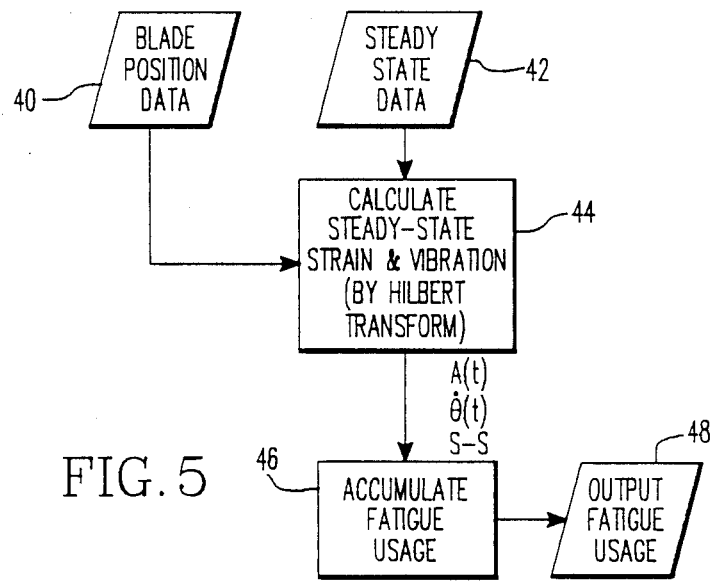
FIG. 5 is a flowchart of the method used by the present invention to accumulate fatigue usage.

As indicated in FIG. 5, blade position data 40 and steady state data 42 is used to calculate vibration and steady state stress in step 44. By using 24 sensors evenly spaced around the row of the turbine blades, the amplitude modulation and frequency modulation of vibration at frequencies up to twelve times the speed of the rotor shaft 10 (the twelfth harmonic) in dependence upon the displacement signals, can be determined. If necessary, the data processing unit 28 can interpolate between the detected points. All significant vibrations of turbine rotor blades are expected to occur below the twelfth harmonic. If fewer sensors are used, the higher frequency vibrations will be aliased within the detected range of frequencies. As a result, as few as two sensors can be used. However, additional signal processing in step 44 is required when few sensors are used.

Two inspection ports, approximately 135° apart, are commonly provided on turbines used for electrical power generation. This permits two passive proximity probes, such as magnetic or capacitive proximity probes, or optical sensors to be installed and used during operation of the turbine. Sensors 16 and 20 are illustrated in FIG. 1 approximately 135° apart and thus are representative of a two sensor per row system for generating signals indicative of the proximity of the turbine blades to the probes.

The two sensors 16 and 20, when used alone, are able to detect all vibrations at frequencies less than the frequency of rotation of the turbine. Thus, if the turbine is rotating at 3600 rpm, vibrations at frequencies less than 60 Hz can be detected. Higher frequencies can be detected as aliased signals. According to the present invention, a Hilbert transform of the displacement signal which provides blade position data 40 is preferably used to determine the frequency and amplitude of the turbine blades. The Hilbert transform of a vibration signal v(t) is defined in equation (3).

$$H(v(t)) = (1/\pi) \int_{-\infty}^{\infty} [v(u)/(t-u)] du \quad (3)$$

The magnitude or amplitude envelope of the signal v(t) is defined by equation (4).

$$A(t) = |v(t)| = \sqrt{v(t)^2 + H(v(t))^2} \quad (4)$$

Figure 6:
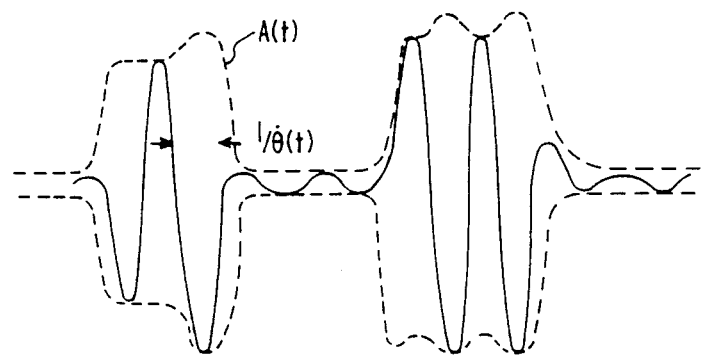
FIG. 6 is a graphical representation of vibration of a turbine blade.

This corresponds to the amplitude envelope A(t) indicated by dashed lines in FIG. 6. The instantaneous frequency $\dot{\theta}$ is defined by equation (5) where $\theta(t)$ is defined by equation (6).

$$\dot{\theta}(t) = (\tfrac{1}{2}\pi)(d\theta(t)/dt) \quad (5)$$

$$\theta(t) = \arctan(H(v(t))/v(t)) \quad (6)$$

Other techniques can also be used to find the amplitude envelope A(t) and instantaneous frequency $\theta(t)$. These are supplied together with the steady state stress S-S to step 46 so that fatigue usage can be accumulated independence upon the vibration of the turbine blades 12. The instantaneous frequency $\dot{\theta}(t)$ provides the value of F(t) and the amplitude A(t) can be converted to actual vibratory stress $\epsilon_a(t)$ using data, generated in laboratory tests which correlates tip deflection and stress, that is stored in the data storage unit 30. Thus, all of the terms required in equation (1) to accumulate fatigue usage are available in step 46 so that fatigue usage can be output in step 48.

It should be noted that equation (1) assumes that the steady state stress $\epsilon_m(t)$ and vibratory stress $\epsilon_a(t)$ should be algebraically added to provide a conservative estimate of accumulated fatigue. Finite element analysis can be used to determine an appropriate manner to add vibratory and steady state stress if it is desired to more closely predict the fatigue life of the object being monitored.

The present invention has been described primarily as applied to fatigue in turbine rotors. Similar types of objects to which the present invention could be applied include airfoils, propeller blades and the compressor section of jet engines. Also, fretting in steam generator tubes accumulates due to vibration in a manner similar to fatigue. Thus, the present invention could be applied to accumulating fretting of steam generator tubes by the use of appropriate sensors. In general, any force exhibiting a "bursty" signature, like that illustrated in FIG. 6 with sudden increases in amplitude for short periods of time, and causing damage which is cumulative may be monitored by accumulating the damage according to the present invention.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A vibratory fatigue measuring apparatus for measuring fatigue in equipment including a turbine rotor having a plurality of turbine blades, comprising:
    sensor means for generating a displacement signal indicating displacement of the turbine blades caused by vibration generated during normal operation of the equipment, said sensor means including at least two sensors positioned outside a path taken by the turbine blades; and
    fatique accumulation means for calculating fatique usage in the turbine rotor in dependence upon the displacement signal.

2. An apparatus as recited in claim 1,
    wherein said sensors comprise passive proximity probes for generating signals indicative of proximity of the turbine blades to said passive proximity probes, and
    wherein said sensor means further comprises means for detecting changes in each of the signals output by each of said passive proximity probes.

3. An apparatus as recited in claim 1, wherein said sensors comprise means for optically detecting the displacement of the turbine blades.

4. An apparatus as recited in claim 1, wherein said sensor means comprises approximately 24 sensors spaced around a row of the turbine blades.

5. An apparatus as recited in claim 4, wherein the 24 sensors are evenly spaced around the row of the turbine blades.

6. A vibratory fatigue measuring apparatus for measuring fatigue in equipment including a turbine rotor having a plurality of turbine blades, comprising:
    sensor means for generating a displacement signal indicating displacement of the turbine blades caused by vibration generated during normal operation of the equipment, said sensor means including at least two and fewer than 24 sensors positioned outside a path taken by the turbine blades; and
    fatique accumulation means for calculating fatique usage in the turbine rotor in dependence upon the displacement signal, said fatique accumulation means comprising:
    frequency-amplitude means for determining frequency modulation and amplitude modulation of the vibration of the turbine blades in dependence upon the displacement signal; and
    fatique usage means for accumulating fatique usage in dependence upon the vibration of the turbine blades.

7. An apparatus as recited in claim 6,
    wherein said frequency-amplitude means utilizes a Hilbert transform of the displacement signal to determine the frequency and amplitude of the turbine blades, and
    wherein said fatique usage means uses Goodman's law to calculate fatique usage.

8. An apparatus as recited in claim 7,
    wherein said sensor means further comprising torque sensing means for sensing torque generated by the turbine, and
    wherein said fatique usage means includes consideration of steady stress on the turbine blades in calculating the fatigue, the steady stress being determined in dependence upon the torque measured by said torque sensing means.

9. An apparatus as recited in claim 8, wherein only two sensors are used in said sensor means.

10. An on-line fatigue measuring apparatus for measuring fatigue of turbine blades in a turbine, comprising:
    two sensors, positioned approximately 135° apart, outside a row of the turbine blades, for detecting passage of the turbine blades without contact therewith for producing sensor signals;

torque sensing means for sensing torque generated by the turbine;

Hilbert transform means for detecting frequency and amplitude of vibration of the turbine blades in dependence upon the sensor signals output by said two sensors; and fatigue usage accumulation means for accumulating fatigue of the turbine blades by application of Goodman's law to the frequency and the amplitude of the vibration of the turbine blades and steady stress on the turbine blades, the steady stress being determined in dependence upon the torque of the turbine.

11. A method for determining damage inflicted upon an object, required to move during operation of equipment including the object, by a force varying during operation of the equipment, comprising the steps of:

(a) detecting displacement of the object caused by the force, substantially throughout normal operation of the equipment;

(b) calculating amplitude and instantaneous frequency of the force from the displacement detected in step (a); and (c) accumulating the damage in dependence upon the amplitude and instantaneous frequency calculated in step (b).

12. A method as recited in claim 11, wherein step (b) utilizes the Hilbert transform of the displacement to calculate the amplitude and the frequency.

* * * * *